Patented June 21, 1932

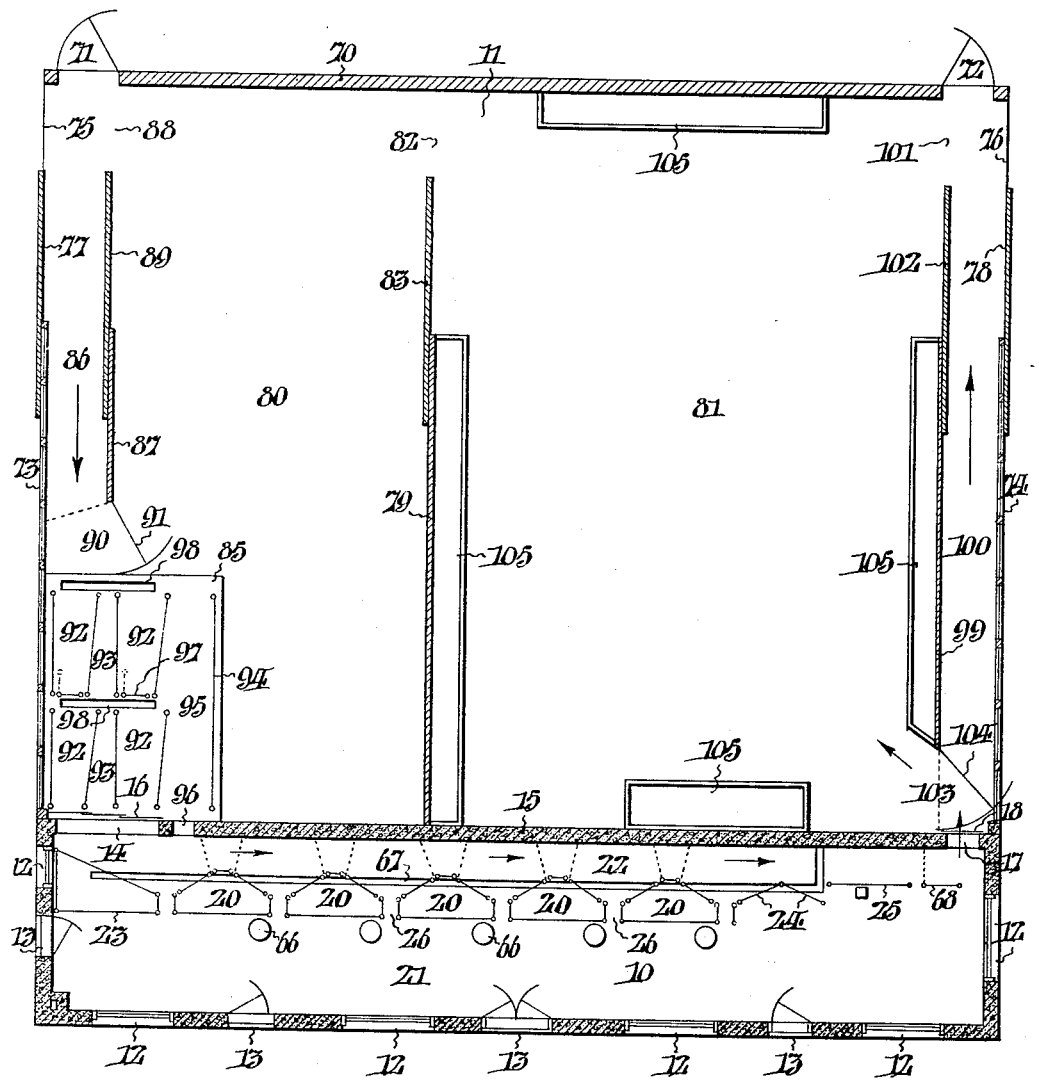
FIG. I.

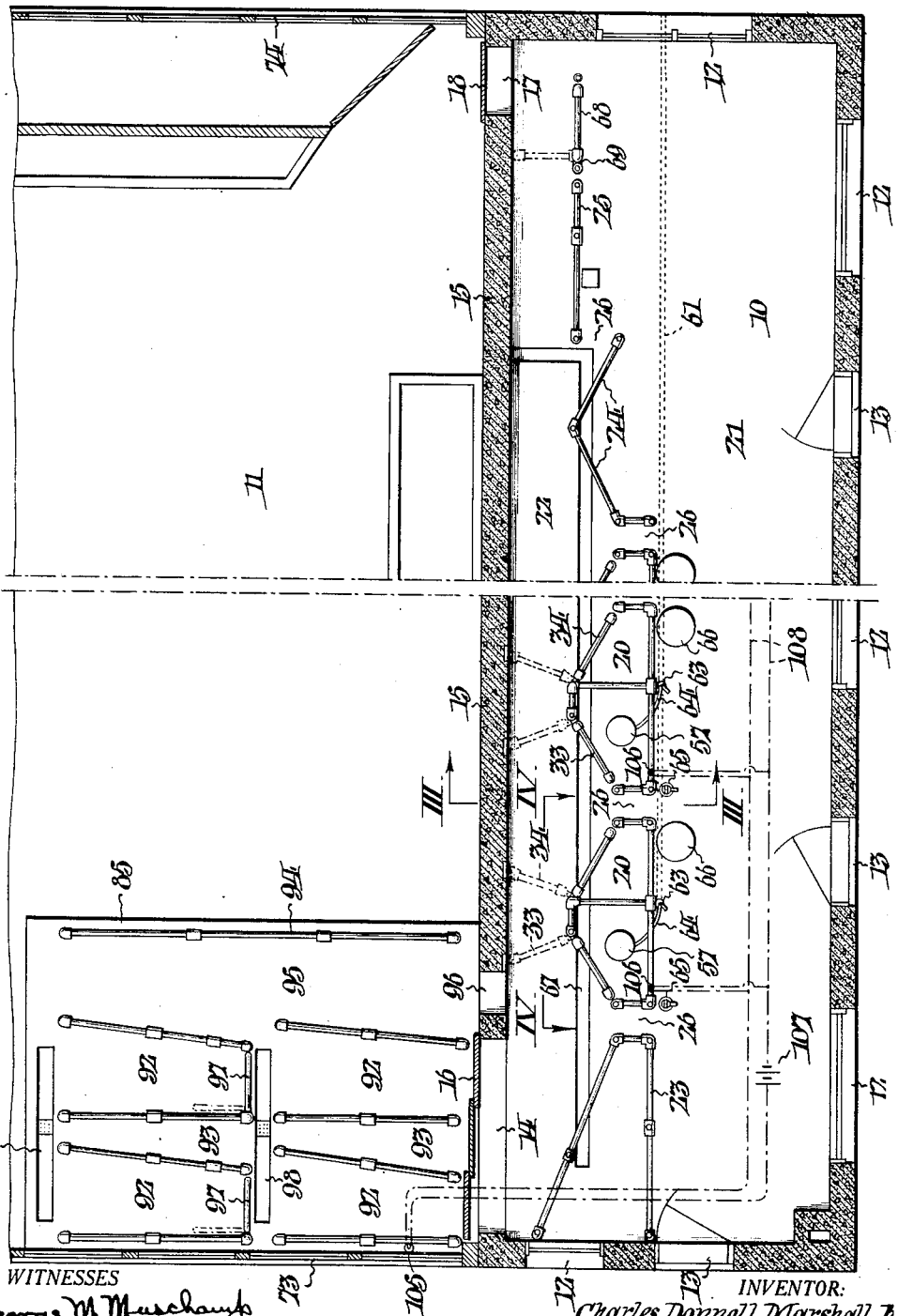

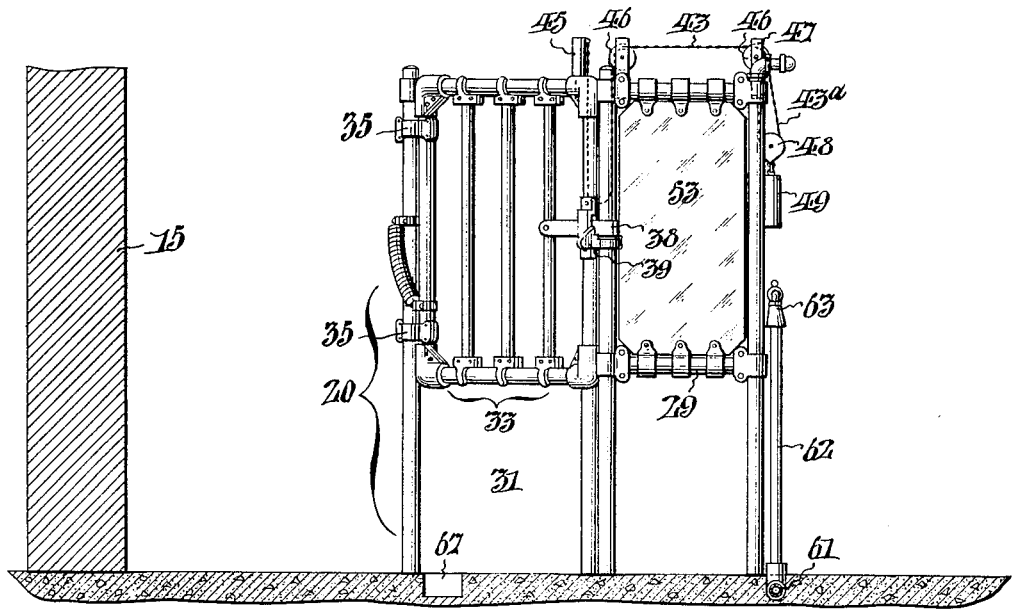
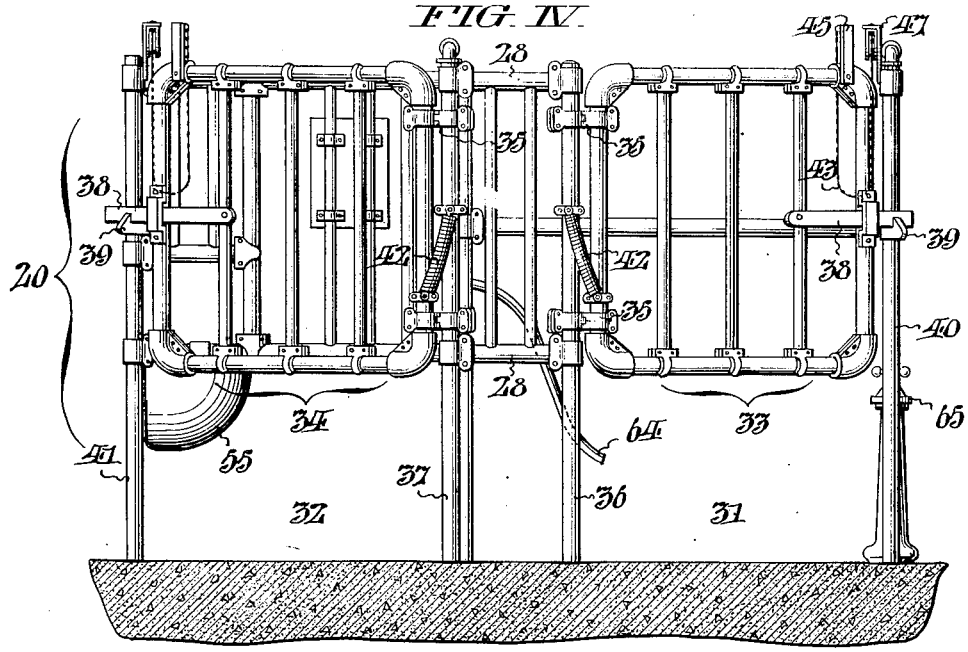

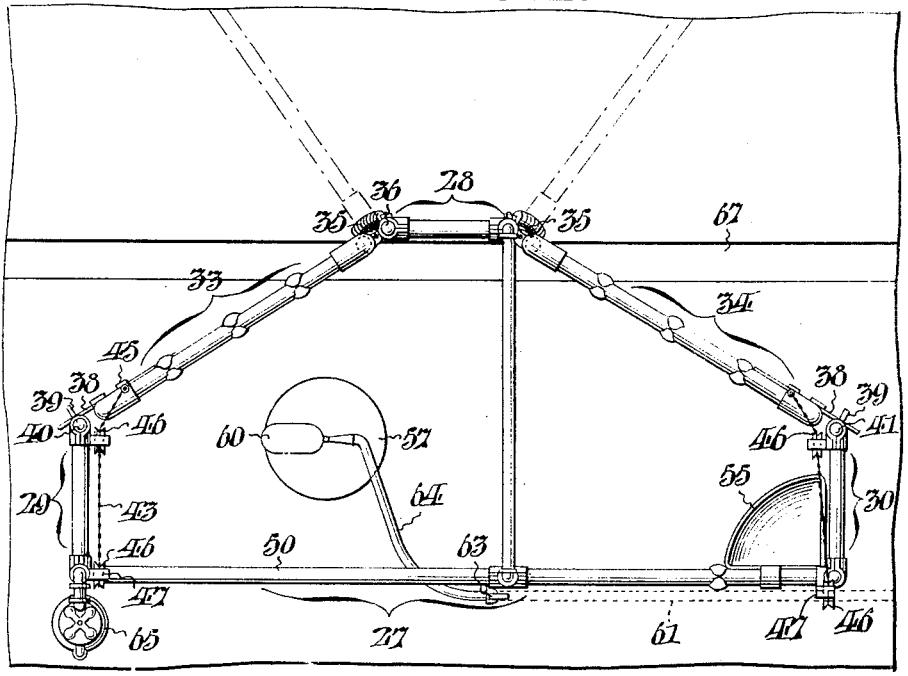
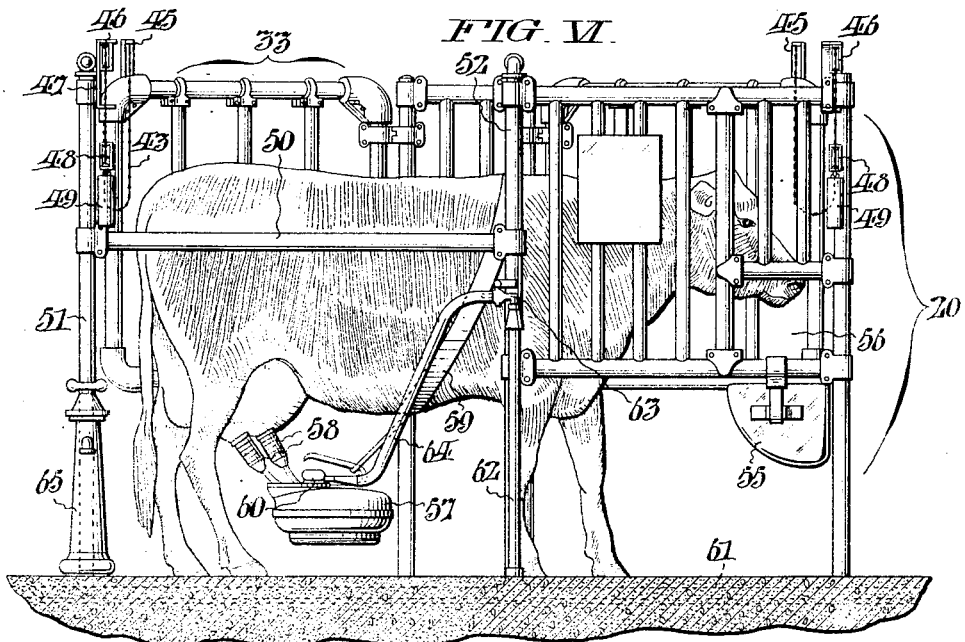

1,863,603

UNITED STATES PATENT OFFICE

CHARLES DONNELL MARSHALL, JR., OF POTTSTOWN, PENNSYLVANIA

DAIRY EQUIPMENT

Application filed March 24, 1930. Serial No. 438,323.

This invention relates to buildings and equipment useful in connection with dairy farms and other establishments devoted to the production of milk and its by-products.

The main object of my invention is to facilitate systematic handling of cows in large numbers through the provision of buildings and equipment by aid of which the operations of grooming, milking and feeding may be expeditiously carried out in a continuous and highly sanitary manner at a minimum expense for labor.

Other objects and attendant advantages of this invention will be manifest from the detailed description hereinafter taken in connection with the attached drawings, whereof Fig. I is a diagrammatic plan view showing my improved dairy equipment, the same being in the form of a covered enclosure or building with subdivisions and appurtenances suitable to the attainment of the above recited ends.

Fig. II is a plan sectional view of the frontal portion of the building on a somewhat larger scale.

Fig. III is a fragmentary sectional view, on a still larger scale, taken as indicated by the arrows III—III in Fig. II, and showing, in end elevation, one of the novel milking stalls embodied in the equipment.

Fig. IV is a rear elevation of the stall, or viewed as indicated by the arrows IV—IV in Fig. II.

Fig. V is a plan view of the stall on a larger scale; and,

Fig. VI is a front view of the stall with a cow therein undergoing milking.

With more specific reference first to Figs. I and II of these illustrations, it will be observed that the delineated building has two main subdivisions designated respectively by the numerals 10, 11. The subdivision 10 which is designed for use as a milking room or chamber is of narrow configuration, and, as shown, extends the full length of the frontal side of the building. The walls and floor of the milking chamber 10 are preferably constructed of concrete masonry so as to be easily kept clean and free of vermin. Ventilation and light for the chamber 10 are had through a number of windows 12 at the front and sides of the building; and direct access from the exterior into the chamber 10 is by way of door openings 13 whereof there are three in the present instance at the front and one at the left hand end. From the subdivision 11, the cows enter the milking chamber 10 at the left hand end through a comparatively wide doorway 14 in the subdividing wall 15, said doorway being controlled by a closure 16 composed of sliding sections. After being milked, the cows leave the chamber 10 at the right hand end through an exit doorway 17 in the subdividing wall 15, and said doorway is likewise controlled by a sliding closure 18. Arranged end to end in serial sequence in the milking chamber 10, are a multiplicity of stalls 20. As shown, the stalls 20 are spaced from the subdividing wall 15 with consequent setting apart within the chamber 10, of a main corridor 21 for the milking attendants, and a single file passage 22 along said partition for the cows. A guide railing 23 adjacent the first of the stalls 20 at the left hand end of the series and immediately to the front of the entrant doorway 14 serves to direct the cows into the passage 22; while beyond the end stall at the right, additional guard railings 24, 25 define a continuation of the passage 22 to the exit doorway 17 that leads into the subdivision 11. For convenience, the stalls 20 and the guard railings 23, 24, 25 are constructed from piping; and it is to be particularly noted from Fig. II that intervals 26 of sufficient width are left between the ends of said guard railings and the stalls 20 to enable entry of attendants from the corridor 21 into the passage 22.

As shown in Figs. III—VI, each stall 20 has a full length front railing 27, and a comparatively narrow back railing 28 which is symmetrically arranged relative to said front railing, as well as narrow end railings 29, 30 which connect with the front railing 27. Angularly disposed inlet 31 and outlet 32 openings afforded at the in side of the stall 20, as a consequence of the described construction, are normally closed by gates 33, 34. These gates 33, 34 swing on hinges 35 secured to the uprights 36, 37 of the back railing 28, and are locked by gravity latches 38 that engage keepers 39 on the uprights 40, 41 of the end railings 29, 30 of the stall 20. Springs 42 associated with the hinges 35 tend to swing the gates 33, 34 independently, to the dot-and-dash line positions shown in Figs. II and V, crosswise of the passage 22 upon release of the latches 38. To enable closing of the gates 33, 34 from the front of the stall 20, I make provisions which in each instance includes a pull chain 43 whereof one end is secured to a bracket 45 fast on the swinging edge of the gate. From the point of attachment to the gate 33 or 34, the chain 43 is first guided upward and then across the top of the stall 20 by fixedly supported directional pulleys 46, and has its opposite end secured to an anchorage bracket 47 on the front railing 27. A drop loop 43a formed by a normal slack in the chain 43 at the front of the stall 20, is engaged by a floating pulley 48 which has an actuating handle 49 attached to it. With this arrangement it will be obvious that by pulling upon the handle 49 the gate 33 or 34 may be swung to closed position incident to which the gravity latch 38 will automatically engage its keeper 39 and hold said gate locked in opposition to the spring 42. The back railing 28 and the gates 33, 34 of the stall 20, as well as the forward half portion of the front railing 27 are of close-grilled construction; while the posterior half portion of said front railing is completely open except for a horizontal connection 50 between its end and medial uprights 51, 52, see Fig. VI. The animal is thus closely confined against turning around or kicking within the stall 20, its udder being however readily accessible from the front of said stall for the purposes of milking. To prevent the cows from seeing each other incident to the milking, the grilled top portions of the end rails 29, 30 of the stalls 20 are provided with inset panels 53 of sheet metal, as shown in Fig. III. Each stall 20 is, moreover, provided at its forward end with a feed receptacle 55 which can be readily charged from the front side of the stall through an opening 56 in the railing 27.

Although the milking may be done by hand, I prefer to use a standardized vacuum-actuated mechanical equipment for the purpose. The milking equipment herein shown by way of exemplification, is of a type wherein a milk receiver 57 with teat cup connections 58 is suspended from the animal by a strap 59, and the milk drawn off by action of a pulsator indicated at 60. The vacuum producing machinery (not shown) forming a part of the milking equipment, may be located at any convenient point, either interiorly or exteriorly of the building, and from it I lead longitudinally of the milking chamber 10 forward of the stalls 20, a pipe main 61. In the present instance, the pipe main 61 is embedded in the concrete floor of the chamber 10; and adjacent the medial upright 52 of each stall front 27 a branch pipe 62 extends upward from said main. Each of these branch pipes 62 is fitted at its top with a control valve 63 which has a nipple for attachment of a flexible tube connection 64 that extends from the pulsator 60 on the milk receiver 57 coordinated with the corresponding stall 20.

The milking chamber 10 is further provided with water hydrants 65, one such hydrant being associated with each stall 20 and preferably at the left hand end, as shown in Fig. II. Also, a feed can 66 with casters is placed adjacent each stall 20 at the right hand end. The floor of the milking chamber 10 is suitably graded so as to drain toward a gutter 67 which extends longitudinally beneath the stalls 20. In order that the cows may be temporarily arrested in the passage 22 for a final inspection and stripping before leaving the milking chamber 10, a gate 68 is hinged at 69 to the railing 25, so as to be swingable cross-wise of the passage 22 as shown in dot-and-dash lines in Fig. II.

The larger subdivision 11 at the rear of the building is intended to serve as a shed for the cattle, and may therefore be constructed of timber. In its back wall 70, adjacent the corners of the building, the subdivision 11 is provided with doorways 71, 72 for the attendants, and in its side walls 73, 74 with contiguously-allocated wider doorways 75, 76 for the cattle, the latter doorways being protected by sliding closures 77, 78. The subdivision 11 is in turn divided by a partition 79 into a herding compartment 80 and a feeding compartment 81. These compartments 80, 81 communicate at the rear through a doorway 82 which is controlled by a sliding gate 83.

Before entering the milking chamber 10 through the doorway 14, the cows are obliged to traverse a raised platform 85 to which they are directed via a single file passage 86 along the side wall 73 of the building. As shown, the passage 86 is defined by a supplemental partition 87 which terminates short of the rear wall 70 of the building with provision of a door opening 88, which, like the opening 75, is protected by a sliding closure 89. The forward end of the supplemental partition 87 terminates in turn short of the platform 85, and the opening 90 thus formed is protected by a door 91 which may be swung either inwards across the passageway 86, to the dotted line position in Fig. I, thereby to permit the cattle to enter upon the platform 85 from the herding compartment 80, or to the full line position to permit the cattle to mount the platform 85 from the passagge 86.

The platform 85 is constructed of concrete masonry and upon it are arranged a group of stalls 92, in the present instance to the number of four. As shown, the stalls 92 are disposed in serially aligned pairs and formed from piping generally after the manner of the milking stalls 20 in the chamber 10. The grooming stalls 92 are laterally spaced as at 93 to an extent permitting passage of the attendants; and a rail 94 along the inner side of the platform 85 sets apart a passage 95 which leads from a small doorway 96 adjacent the entrant doorway 13 so that the attendants may pass from the milking chamber 10 into the herding compartment 80. The two leading grooming stalls of the group 92 are normally shut off by the sliding closure 16 of the doorway 14; and the rear stalls are provided at their forward ends with gates 97 which are swingable back to the dotted line positions to permit cows to advance through the leading pair into the milking chamber 10. The platform 85 is suitably graded for drainage towards gutters 98, and, in practice, is fitted with the accessories (not shown) needed in grooming. A supplementeal partition 99 in the feeding compartment 81 serves to set apart a single file passage 100 along the side wall 74 of the building, said partition, like the partition 87 in the herding compartment 80, terminating short of the rear wall 70 of the building with provision of an opening 101 which is protected by a sliding closure 102. The partition 99 also terminates short of the subdividing partition 15; and the opening 103 thus afforded is fitted with a door or gate 104 which is swingable from the dotted position to the full line position in Fig. I, so that cows leaving the milking chamber 10 via the doorway 17 may be diverted either into the feeding shed 81 or into the passageway 100. As shown in Fig. I, the feeding shed 81 is equipped along its four sides with mangers and water troughs 105 for the cattle.

As a further adjunct to the equipment for a specific purpose later on explained, I provide a conventional electric signal system, which, as shown, in Fig. II, includes a visible or audible signal device 105' on or near the grooming platform 94, push buttons 106 whereof there is one secured to each milking still 20 in the chamber 10; a battery 107; and circuit conductors 108 with parallel connections to the several push buttons 106.

The method of operation of my improved equipment is as follows:

The sliding door 83 between the herding and feeding compartments 80, 81 of the shed 11 is closed; and the doors 77, 89 in the left hand side 73 of the building are opened to permit entry of the cows from the pasture into the enclosure compartment 80. After assembling of the cattle in the compartment 80, the door 77 is closed; but the door 89 is left partly opened so that the cows may enter the passage 86 one by one for guidance to the grooming platform 85. With the gates 97 on the rear pair of the grooming stalls 92 closed, the first two cows are arrested in said stalls, and, while thus detained, are thoroughly curried and brushed. When this has been accomplished, the gates 97 are opened to permit the cows to advance into the leading pair of the grooming stalls 92 where their udders are washed and wiped, and the fore milk is extracted for examination. With the cows thus prepared for milking, the door 16 is opened for them to advance one at a time into the passage 22 between the milking stalls 20 and the subdividing walls 15 within the chamber 10. As the first cow makes her appearance at the door 14, an attendant in the chamber 10 releases the latch 38 of the inlet gate 33 of one of the stalls, say the leading one in the series, whereupon said gate is automatically swung crosswise of the passage 22 as already understood. The cow is accordingly obliged to enter the stall 20 selected for her, and when she is once within it, the inlet gate 33 is closed and locked through pulling of the associated chain 43, and the milking device 57 applied to the cow, as shown in Fig. VI. The above procedure is continuously repeated, that is to say, the cows are successively led from the herding compartment 80 into the grooming stalls 92, made ready for milking, and then directed into the chamber 10 until all the stalls 20 are filled. When the first entered cow has been milked, the outlet gate 34 of the corresponding stall 20 is unlatched by the attendant and said gate automatically swung crosswise of the passage 22 to guide the released cow further along toward the exit doorway 17. Immediately upon vacation of the stall 20 the outlet gate 34 is closed by pulling upon its actuating chain 43, the inlet gate 33 opened, and the button 106 associated with said stall pushed. The attendant on the grooming platform 85 is thereby given the signal to release another cow through the entrant doorway 14 for occupation of the empty milking stall 20 within the chamber 10. During milking, each cow is apportioned a certain amount of grain in accordance with individually specified requirements and a record is made of the amount of milk which each cow yields. The milked cows successively released in the manner explained advance further along in the passage 22 are individually detained at the railing 25 by closure of the gate 28; and while thus arrested, thoroughly inspected and stripped of residual milk whereupon they are permitted to proceed from the chamber 10 through the exit doorway 17 into the passage 100 along the side wall 74 of the building. Then, by proper control of the doors 78 and 102, the cows are either dismissed from the building into the pasture, or directed into the feed compartment 81.

From the foregoing it will be seen that the novel facilities which I have provided are conducive to expeditious handling of cows in large numbers by a minimum number of attendants with economic production of milk scientifically under absolutely sanitary conditions.

Having thus described my invention, I claim:

1. In dairy equipment including a milking chamber, the combination of a number of milking stalls with means affording angularly disposed inlet and outlet openings serially arranged end to end in said chamber and spaced from one wall thereof with provision of a single file passage for the cows between an entrant doorway at one end and an exit doorway at the other, each such stall having an inlet gate with a latch to normally hold it closed and means to automatically swing it open, when released, to a position crosswise of the passage aforesaid to divert a cow into the stall, each stall also having an outlet gate, including a latch to hold it normally closed with means operative upon release of said latch to similarly swing the gate open crosswise of the passage to direct the cow back into said passage headed toward the exit door aforementioned, and means whereby the inlet and outlet gates may be individually closed from out side of the stall, including pull chains attached at one end to the swinging ends of the gates, guide pulleys for directing the chains forwardly over the tops of the stalls, and actuating handles attached to the ends of the pull chains at the outside of the stall.

2. In dairy farm equipment including a milking chamber, the combination of a number of milking stalls with means affording angularly disposed inlet and outlet openings for individual cows serially arranged end to end in said chamber and spaced from one wall thereof with provision of a single file cow passage between an entrant doorway at one end and an exit doorway at the other; means individual to each inlet and outlet opening whereby a cow may be diverted from the passage aforesaid into any one of the stalls for the purpose of milking, and subsequently from such stall back into the passage headed toward the exit doorway; a railing forming, in conjunction with the last stall of the series, the afterpart of the passage aforesaid, and a gate swingable crosswise of the afterpart of the passage whereby the cows may be temporarily detained for inspection and stripping before being permitted to pass out through the exit doorway.

3. In dairy equipment including a milking chamber, the combination of a number of milking stalls with means affording angularly disposed inlet and outlet openings for individual cows serially arranged end to end in the chamber and spaced from one wall thereof with provision of a single file cow passage between an entrant doorway at one end and an exit doorway at the other; means individual to each inlet and outlet opening whereby a cow may be diverted from the passage aforesaid into any one of the stalls for the purpose of milking and subsequently from such stall back into the passage headed toward the exit doorway; a vacuum-actuated milking device associated with each of the stalls; and a vacuum pipe main extending longitudinally of the chamber in the space for the milking attendants at the front of the stalls, said main being embedded in the floor of the chamber and having branches extending up adjacent the several stalls for connection of the milking devices associated with said stalls.

4. In dairy equipment including a milking chamber, the combination of a number of milking stalls with means affording angularly disposed inlet and outlet openings for individual cows serially arranged end to end in the milking chamber and spaced from one wall thereof with provision of a single file cow passage between an entrant doorway at one end and an exit doorway at the other; means individual to each inlet and outlet opening whereby a cow may be diverted from the passage aforesaid into any one of the stalls for milking and afterwards from such stall back into the passage headed toward the exit doorway; and a platform with a number of serially arranged grooming stalls to receive individual cows, said grooming stalls communicating direct with the cow passage in the milking chamber by way of the entrant doorway aforementioned, the leading grooming stalls being controlled by a closure of relatively slidable sections at the entrant doorway, and the other stalls at the rear by individually associated gates.

5. In dairy farm equipment including a building with a transverse subdividing wall setting apart therein at the front, a milking chamber, and at the rear a shed for the cattle, said shed being in turn subdivided into a herding compartment and a feeding compartment with controllable intercommunication; the combination of a number of milking stalls for individual cows, each such stall embodying a full length front, a comparatively short back and narrow end railings with angularly disposed inlet and outlet closures, said stalls being serially arranged end to end in the milking chamber and spaced from the transverse subdividing wall aforesaid to provide a single file cow passage between an entrant doorway leading from the herding compartment of the shed into one end of the milking chamber, and an exit doorway leading from said milking chamber at the other end into the feeding compartment of the shed, and separately controlled doors at the back of the building for entry of the cows from the exterior into the herding compartment of the shed and for their exit from the feeding compartment.

6. In dairy farm equipment including a building with a transverse subdividing wall setting apart a milking chamber at the front and a shed for the cattle at the rear of the building, said shed being in turn subdivided into a herding compartment and a feeding compartment with controllable intercommunication at the rear; a number of milking stalls for individual cows, each such stall embodying a full length front, a comparatively short back and narrow end railings with angularly disposed inlet and outlet closures, said stalls being serially arranged end to end in the milking chamber and spaced from the partition wall aforesaid to provide a single file cow passage from an entrant doorway leading from the herding compartment of the shed into one end of the milking chamber, and an exit doorway leading from said milking chamber at the other end into the feeding compartment of the shed, a supplemental partition along one side of the building defining a single file cow passage in the herding compartment of the shed to the entrant door of the milking chamber; closures whereby the cows may be directed into the last mentioned passage either from without the building or from within said herding chamber; a similar supplemetal partition defining along the opposite side of the building, a third single file passage-way leading rearward from the exit doorway of the milking chamber; and closures whereby the cows may be directed from the rear of said third passage either into the feeding compartment or to the exterior of the building.

7. Dairy farm equipment including a building with a transverse subdividing wall setting apart therein a milking chamber along the front and a shed for cattle at the rear; the combination of a number of individual milking stalls, each such stall embodying a full length front, a comparatively short back and narrow end railings with angularly disposed inlet and outlet closures, said stalls being serially arranged end to end in the chamber and spaced from the transverse subdividing wall aforesaid to provide a single cow passage between an entrant doorway leading from the shed into the chamber at one end, and an exit doorway leading from the passage at the other end of the milking chamber into the shed; a grooming platform within the shed affording a number of serially arranged grooming stalls immediately before the entrant doorway into the milking chamber; a supplemental partition along one side of the building defining a single file cow passage from the rear of the shed to the grooming platform; and closures whereby the cows may be directed into the last mentioned passage from the exterior of the building or from within the shed.

In testimony whereof, I have hereunto signed my name at Philadelphia, Pennsylvania, this twenty-first day of March, 1930.

CHARLES DONNELL MARSHALL, Jr.